(12) United States Patent
Di Carlo

(10) Patent No.: US 12,374,990 B2
(45) Date of Patent: Jul. 29, 2025

(54) SINGLE-PHASE BI-DIRECTIONAL POWER FACTOR CORRECTION FOR AN ELECTRIC VEHICLE

(71) Applicant: BorgWarner Inc., Auburn Hills, MI (US)

(72) Inventor: Luca Di Carlo, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 36 days.

(21) Appl. No.: 18/281,478

(22) PCT Filed: Mar. 11, 2021

(86) PCT No.: PCT/US2021/021846
§ 371 (c)(1),
(2) Date: Sep. 11, 2023

(87) PCT Pub. No.: WO2022/191844
PCT Pub. Date: Sep. 15, 2022

(65) Prior Publication Data
US 2024/0154522 A1 May 9, 2024

(51) Int. Cl.
*H02M 1/42* (2007.01)
*B60L 53/22* (2019.01)
(Continued)

(52) U.S. Cl.
CPC ........... *H02M 1/4233* (2013.01); *B60L 53/22* (2019.02); *H02J 3/322* (2020.01); *H02J 7/02* (2013.01);
(Continued)

(58) Field of Classification Search
CPC ..... H02M 1/4233; H02M 7/217; B60L 53/22; H02J 3/322; H02J 7/02; H02J 2207/20; H02J 2310/48
See application file for complete search history.

(56) References Cited

U.S. PATENT DOCUMENTS 10,193,462 B1   1/2019  Leong
10,910,943 B1*  2/2021  Lin .................... H02M 1/4225
(Continued)

FOREIGN PATENT DOCUMENTS

KR    20190040902 A     4/2019
WO    WO2016160350 A1   10/2016

OTHER PUBLICATIONS

International Preliminary Report On Patentability for International Application No. PCT/US2021/021846 dated Sep. 12, 2023 (4 pages).
(Continued)

*Primary Examiner* — Jared Fureman
*Assistant Examiner* — Duc M Pham
(74) *Attorney, Agent, or Firm* — Reising Ethington P.C.

(57) ABSTRACT

A power factor correction module bi-directionally communicates single¬ phase alternating current (AC) between an electrical grid and the electrically-propelled vehicle and includes a first inductor electrically connected to a first primary switch and a second primary switch; a second inductor electrically connected to a third primary switch and a fourth primary switch; a first rectifying switch electrically connected to the first primary switch and the third primary switch; and a second rectifying switch electrically connected to the second primary switch and the fourth primary switch, wherein a microprocessor concurrently opens two primary switches and one rectifying switch while closing two other primary switches and another rectifying switch during communication of single-phase electrical current from the electrical grid through the first inductor and the second inductor to the electrically-propelled vehicle or during communication of single-phase electrical current from the vehicle through the first inductor and the second inductor to the electrical grid.

7 Claims, 9 Drawing Sheets

(51) Int. Cl.
  *H02J 3/32* (2006.01)
  *H02J 7/02* (2016.01)
  *H02M 7/217* (2006.01)
(52) U.S. Cl.
  CPC ......... *H02M 7/217* (2013.01); *H02J 2207/20* (2020.01); *H02J 2310/48* (2020.01)

(56) References Cited

U.S. PATENT DOCUMENTS

| | | |
|---|---|---|
| 2016/0181944 A1 | 6/2016 | James et al. |
| 2016/0243952 A1 | 8/2016 | Lasagni |
| 2017/0047744 A1* | 2/2017 | Kim .................... H02M 1/4225 |
| 2021/0122255 A1* | 4/2021 | Liang .................... B60L 1/006 |
| 2022/0219553 A1* | 7/2022 | Fu .................... H02M 3/33573 |

OTHER PUBLICATIONS

International Search Report for International Application No. PCT/US2021/021846 dated Dec. 9, 2021 (3 pages).

Written Opinion for International Application No. PCT/US2021/021846 dated Dec. 9, 2021 (3 pages).

Caroline Ann Sam et al., Bidirectional integrated on-board chargers for electric vehicles—a review, Sadhana 46, Feb. 4, 2021 (14 pages).

* cited by examiner

SINGLE-PHASE BI-DIRECTIONAL POWER FACTOR CORRECTION FOR AN ELECTRIC VEHICLE

TECHNICAL FIELD

The present application relates to electrical circuits and, more particularly, to electrical circuits used with electric vehicles.

BACKGROUND

Modern vehicles are increasingly propelled, at least partially, by one or more electrical motors powered by higher-voltage batteries. These vehicles are often referred to as electric vehicles (EV) or hybrid-electric vehicles (HEV) and include an on-board vehicle battery charger for charging the batteries that power the electrical motors. These batteries may have a significantly higher voltage than those used with vehicles not powered by electrical motors. Unlike batteries used with vehicles solely powered by an internal combustion engine (ICE), the on-board vehicle battery charger can regulate incoming alternating current (AC) electrical power received by the EV from EV supply equipment, such as a charging station, fixed to a residence or a particular geographic location. On-board vehicle battery chargers can include modules that carry out power factor correction (PFC). Single phase PFC can receive AC electrical power from a grid and convert it to direct current (DC) electrical power used by the vehicle. The single-phase PFC circuit can include active and passive electrical components to communicate electrical power bi-directionally between the EV supply equipment and the vehicle. Vehicles are increasingly able to supply electrical power stored in the vehicle battery to a residence or other load and existing single-phase PFC circuits can be configured to more efficiently transfer electrical power bidirectionally between the vehicle and an electrical grid.

SUMMARY

In one implementation, a power factor correction (PFC) module configured to electrically connect with an electrically-propelled vehicle and bi-directionally communicate single-phase alternating current (AC) between an electrical grid and the electrically-propelled vehicle comprises a first inductor electrically connected to a first primary switch and a second primary switch; a second inductor electrically connected to a third primary switch and a fourth primary switch; a first rectifying switch electrically connected to the first primary switch and the third primary switch; and a second rectifying switch electrically connected to the second primary switch and the fourth primary switch, wherein a microprocessor concurrently opens two primary switches and one rectifying switch while closing two other primary switches and another rectifying switch during communication of single-phase electrical current from the electrical grid through the first inductor and the second inductor to the electrically-propelled vehicle or during communication of single-phase electrical current from the electrically-propelled vehicle through the first inductor and the second inductor to the electrical grid.

DETAILED DESCRIPTION

An on-board vehicle battery charger (OBC) carried by an electric vehicle (EV) can include a single-phase power factor correction (PFC) module having electrical circuitry components that regulate electrical power supplied to the EV from the electrical grid as well as electrical power supplied from the EV to the electrical grid; the PFC module is bi-directional. The PFC module includes six switches, a bulk capacitance, and a load. Four of the switches comprise primary switches. The remaining switches include a first rectifying switch and a second rectifying switch. A first inductor and a second inductor can be electrically connected in parallel to the primary switches. The present PFC module can be controlled so that two of the primary switches are active along with one of the first rectifying switch or the second rectifying switch. In that way, current can be divided and flow through the first inductor and the second inductor simultaneously during electrical grid to EV transmission or during EV to grid transmission. In contrast, past PFC modules using six switches may activate only two of the six switches at once thereby flowing current through only one inductor from the vehicle to the grid. The flow of current through one inductor from the vehicle to the grid reduces the power by half and results in a lower power density than the PFC module described here.

Figure 1:
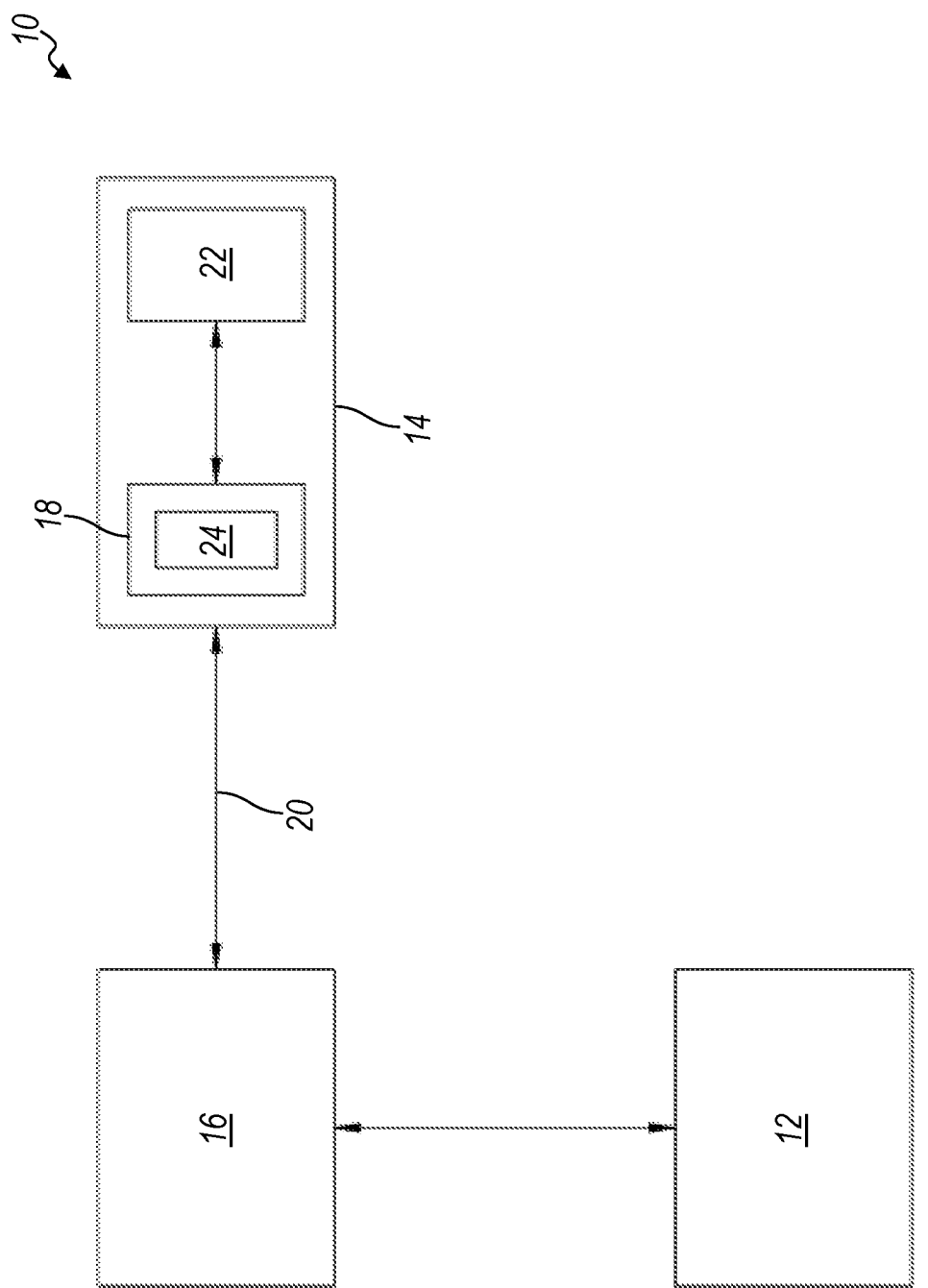
FIG. 1 is a block diagram depicting an electrical system that includes an implementation of a switching circuit.

Turning to FIG. 1, an implementation of an electrical system 10 is shown including an electrical grid 12 and an electric vehicle (EV) 14 that can either receive electrical power from or provide electrical power to the grid 12. The electrical grid 12 can include any one of a number of electrical power generators and electrical delivery mechanisms. Electrical generators (not shown), such as nuclear, hydraulic-, or wind-powered plants that convert the energy of nuclear fission, flow of water through dams, or wind power of a turbine, create AC electrical power that can then be transmitted a significant distance away from the electrical generator for residential and commercial use. The electrical generator can couple with the electrical grid 12 that transmits the AC electrical power from the electrical generator to an end user, such as a residence or business. As the AC electrical power is provided to the electrical grid 12, the electrical power can exist at a relatively high voltage so that it can be communicated relatively long distances. Once the electrical power reaches a location where it is intended to be used, electrical transformers (not shown) can be used to reduce the voltage level before ultimately being provided to a residence or business. In one implementation, the voltage level of AC electrical power received by the residence or business is 240 volts (V). However, this voltage can be a different value. The term electric vehicle can refer to a vehicle that is wholly or at least partially propelled by electrical power and/or electrical motors. EV can refer to electric vehicles, plug-in electric vehicles, hybrid-electric vehicles, and battery-powered vehicles. The EV can receive electrical energy from the electrical grid 12 and, in some implementations, provide electrical energy that is stored in a vehicle battery to the electrical grid 12. EV can be used interchangeably with the term electrically-propelled vehicle or hybrid-electric vehicle.

EV supply equipment 16, also referred to as an electric-vehicle-charging station, can receive AC electrical power from the grid 12 and provide the electrical power to the EV 14. Also, the EV supply equipment 16, also referred to as a charging station, can receive stored electrical power from a vehicle battery 22 that has been converted from DC to AC electrical power and transfer it to the grid 12. The charging station can be geographically fixed, such as a charging station located in a vehicle garage or in a vehicle parking lot. The charging station 16 can include an input terminal that receives the AC electrical power from the grid 12 and communicates the AC electrical power to an on-board vehicle battery charger 18 included on the EV 14. Conversion of DC to AC electrical power can be accomplished at the on-board vehicle battery charger 18 before the power is supplied to the EV supply equipment 16 and, ultimately, the grid 12. An electrical cable 20 can detachably connect with an electrical receptacle on the EV 14 and electrically link the charging station 16 with the EV 14 so that AC electrical power can be communicated between the charging station 16 and the EV 14. The charging station 16 can be classified as "Level 2" EV service equipment that receives 240 VAC from the grid 12 and supplies 240 VAC to the EV 14. One implementation of the charging station 16 is a Siemens VersiCharge™ Residential EV Charging Solution. It is possible the level of AC electrical power input to a charging station and/or the level of AC electrical power output from a charging station is different in other implementations. The vehicle battery 22 can supply DC electrical power, that has been converted from AC electrical power, to the electric motors that propel the EV. The vehicle battery 22 or batteries are rechargeable and can include lead-acid batteries, nickel cadmium (NiCd), nickel metal hydride, lithium-ion, and lithium polymer batteries. A typical range of vehicle battery voltages can range from 200 to 800V of DC electrical power (VDC).

Figure 2:
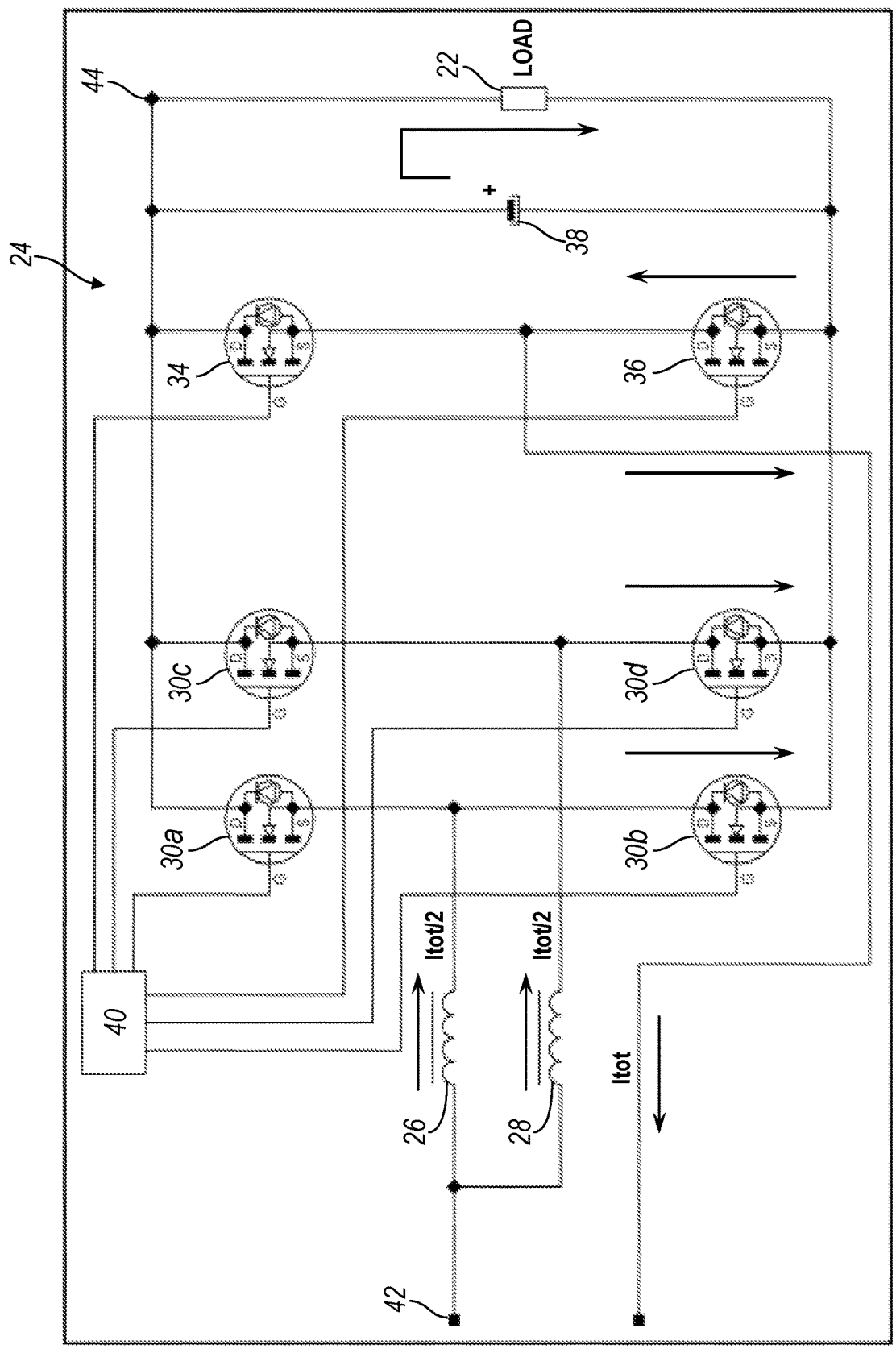
FIG. 2 is a circuit diagram depicting an implementation of a power factor conversion (PFC) module supplying electrical power from the electrical grid to a vehicle battery.

The on-board vehicle battery charger 18 can be electrically connected to the EV supply equipment 16 and communicate electrical power between the vehicle battery 22 and the EV supply equipment 16. AC electrical power received from the grid 12 can be converted to DC by the on-board vehicle battery charger 18 that may be located on the EV 14. The on-board vehicle battery charger 18 can include a power factor correction (PFC) module 24 that converts single-phase AC electrical power into DC electrical power as is shown in FIG. 2. In addition, the PFC module 24 can also act as an inverter that converts DC electrical power into AC electrical power, which can be transmitted outside of the EV 14.

An implementation of the power factor conversion (PFC) module 24 is shown in FIGS. 2-9 including a first inductor 26, a second inductor 28, primary switches 30, a first rectifying switch 34, a second rectifying switch 36, and bulk capacitance 38. The PFC module 24 is shown electrically connected to a load, such as the vehicle battery 22. The first inductor 26 and the second inductor 28 can be electrically connected to single-phase alternating current (AC) electrical power from the electrical grid 12. Two of the primary switches 30 can alternately be opened or rendered conductive to flow current through the first and second inductors 26, 28 along with the first rectifying switch 34 or the second rectifying switch 36. That is, when the two of the primary switches 30 are opened by applying a voltage to their gates, two other primary switches remain closed, and either the first rectifying switch 34 or the second rectifying switch 36 can receive a voltage at a gate and becomes conductive. As a result, the PFC module 24 generally can control the switches 30, 32, 34, 36 so that three switches are conductive or open and three switches are closed during operation. A microprocessor 40 can be electrically linked to the gates of the first pair of primary switches 30, the second pair of primary switches 32, the first rectifying switch 34, and the second rectifying switch 36 to open and close the switches 30, 32, 34, 36.

The PFC module 24 includes a grid connector 42 that electrically connects the module 24 to the electrical grid 12 and a battery connector 44 that electrically connects the module to the vehicle battery 22. The first inductor 26 and the second inductor 28 can be electrically connected to the grid connector 42 such that electrical current flowing between the PFC module 24 and the electrical grid 12 is divided between the first inductor 26 and the second inductor 28. The first inductor 26 is electrically connected to the source of switch one 30a and the drain of switch two 30b while the second inductor 28 is electrically connected to the source of switch three 30c and the drain of switch four 30d. The drain of switch one 30a, switch three 30c and the first rectifying switch 34 and the source of switch three 30c, switch four 30d, and the second rectifying switch 36 can be electrically connected to the bulk capacitance 38 and the vehicle battery 22 in parallel. The source of the first rectifying switch 34 and the drain of the second rectifying switch 36 can be electrically connected to neutral. The switches 30, 34, 36 included in the PFC module 24 can be implemented using field effect transistors (FETs), such as metal-oxide-semiconductor field effect transistors (MOSFETs). The microprocessor 40 electrically linked to the gate of each switch 30, 34, 36 can control the rectification of AC electrical power as well as the inversion of DC electrical power. The microprocessor 40 can be any type of device capable of processing electronic instructions including microcontrollers, host processors, controllers, vehicle communication processors, and application specific integrated circuits (ASICs). It can be a dedicated processor used only to carry out the described actions or can be shared with other vehicle systems. The microprocessor 40 executes various types of digitally-stored instructions, such as software or firmware programs stored in memory. However, it should be appreciated that other implementations are possible.

Figure 3:
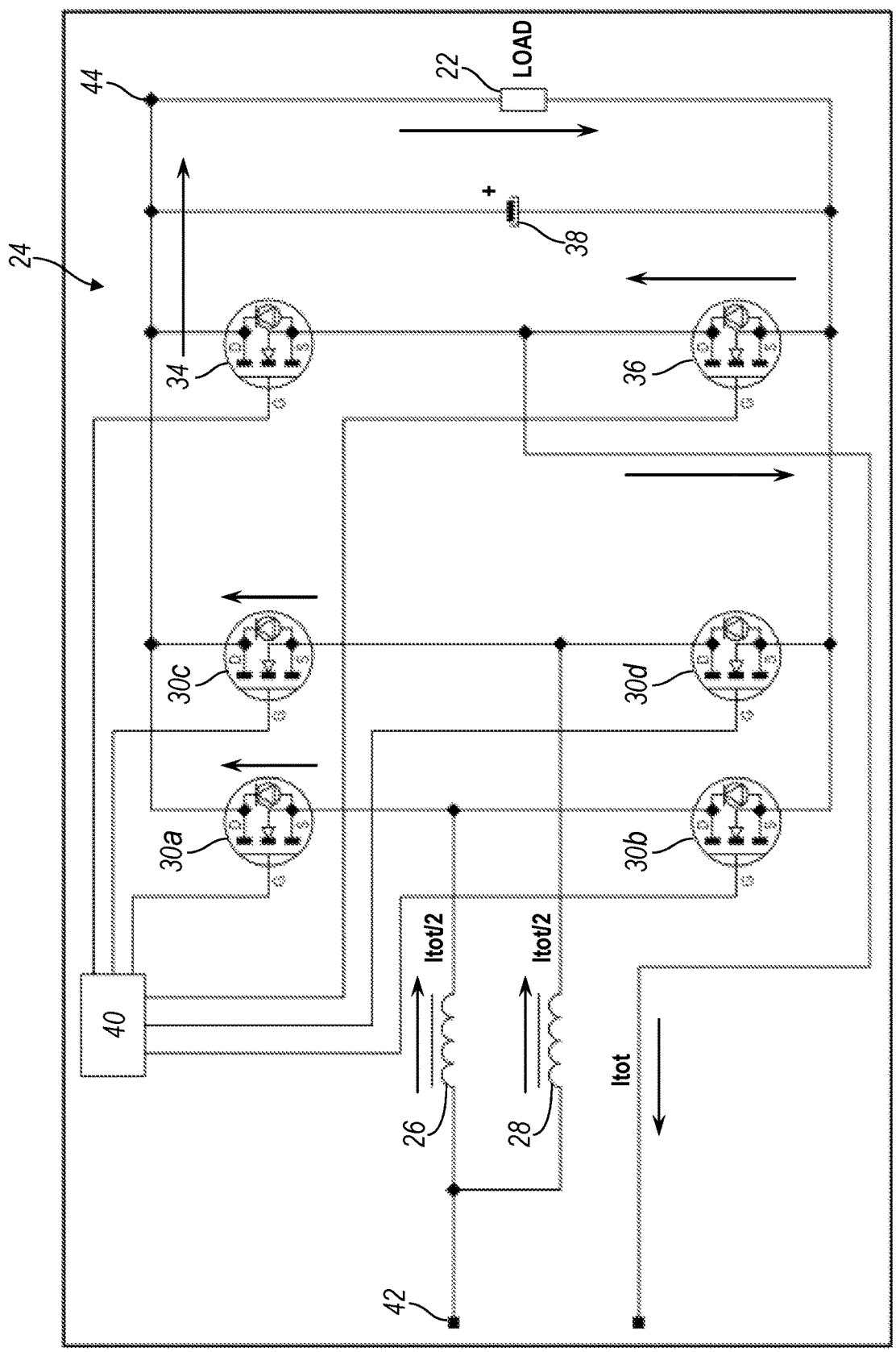
FIG. 3 is a circuit diagram depicting an implementation of a PFC module supplying electrical power from the electrical grid to the vehicle battery.
Figure 4:
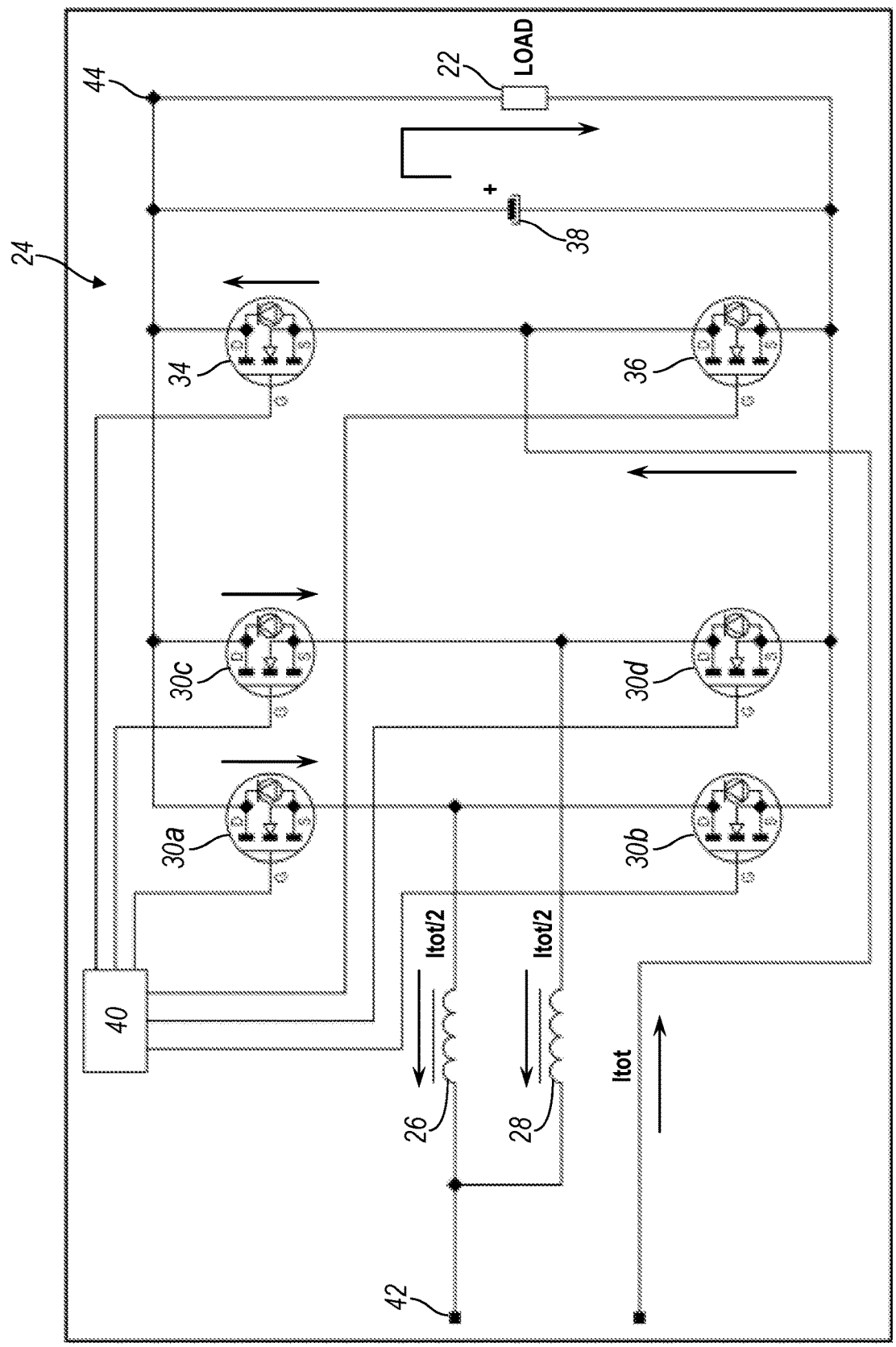
FIG. 4 is a circuit diagram depicting an implementation of a PFC module supplying electrical power from the electrical grid to the vehicle battery.
Figure 5:
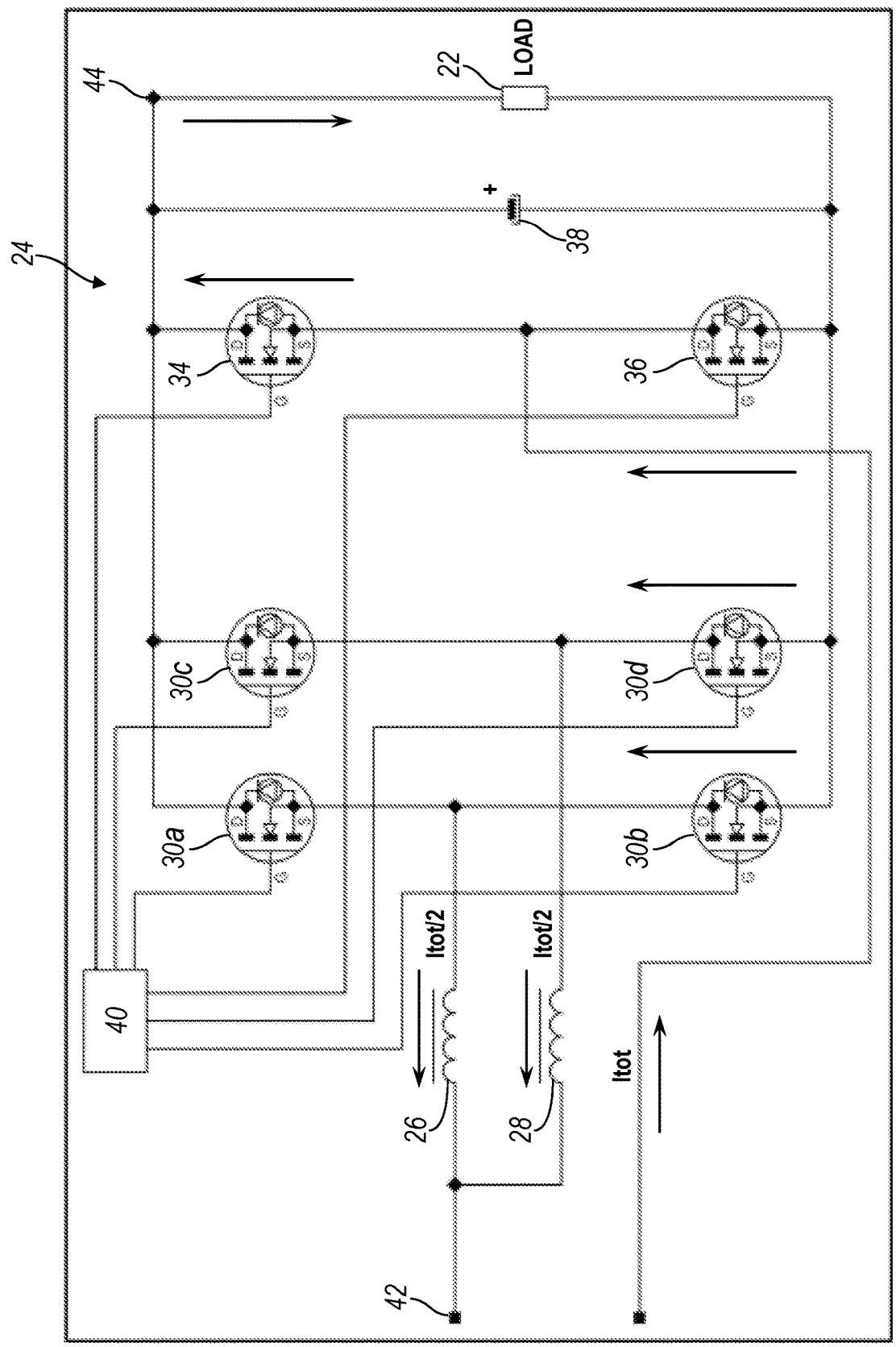
FIG. 5 is a circuit diagram depicting an implementation of a PFC module supplying electrical power from the electrical grid to the vehicle battery.

Turning to FIGS. 2-5, the PFC module 24 is depicted operating to communicate electrical power from the electrical grid 12 to the vehicle battery 22. FIGS. 2-3 depict a positive portion of single-phase AC current received at the PFC module 24 whereas FIGS. 4-5 depict a negative portion of the single-phase AC current. The single-phase electrical current can be received at the grid input 42. Electrical current can be divided between the first inductor 26 and the second inductor 28 as it is communicated with the primary switches 30. During the positive portion of the single-phase AC current, the microprocessor 40 can open switch two 30b, switch four 30d, and the second rectifying switch 36 while closing switch one 30a, switch three 30c, and the first rectifying switch 34. Electrical current can flow through switch two 30b, switch four 30d, and the second rectifying switch 36 as is shown with arrows in FIG. 2.

The microprocessor 40 can then open switch one 30a, switch three 30c, and the first rectifying switch 34 while closing switch two 30b, switch four 30d, and the second rectifying switch 36. Electrical current can flow through switch one 30a, switch three 30c, and the first rectifying switch 34 as is shown with arrows in FIG. 3.

During the negative portion of the single-phase AC current, the microprocessor 40 can open switch one 30a, switch three 30c, and first rectifying switch 34 while closing switch two 30b, switch four 30d, and the second rectifying switch 36. Electrical current can flow through switch one 30a, switch three 30c, and the first rectifying switch 34 as is shown with arrows in FIG. 4.

The microprocessor 40 can then open switch two 30b, switch four 30d, and the first rectifying switch 34 while closing switch one 30a, switch three 30c, and the second rectifying switch 36. Electrical current can flow through switch two 30b, switch four 30d, and the first rectifying switch 34 as is shown with arrows in FIG. 5. The sequential opening and closing of switches 30, 34, 36 as described above with regard to FIGS. 2-5 can repeat as single-phase AC current is supplied from the electrical grid 12 to the EV 14. It should be appreciated that it is not necessary to open and close switches 30a and 30c and switches 30b and 30d simultaneously, but rather switches 30a and 30c and switches 30b and 30d can be controlled in an interleaved way such that a bridge consisting of switch 30a and 30b and another bridge consisting of switch 30c and switch 30d can be independently controlled and the gate signals of each bridge can be phase shifted by one half a period relative to each other.

Figure 6:
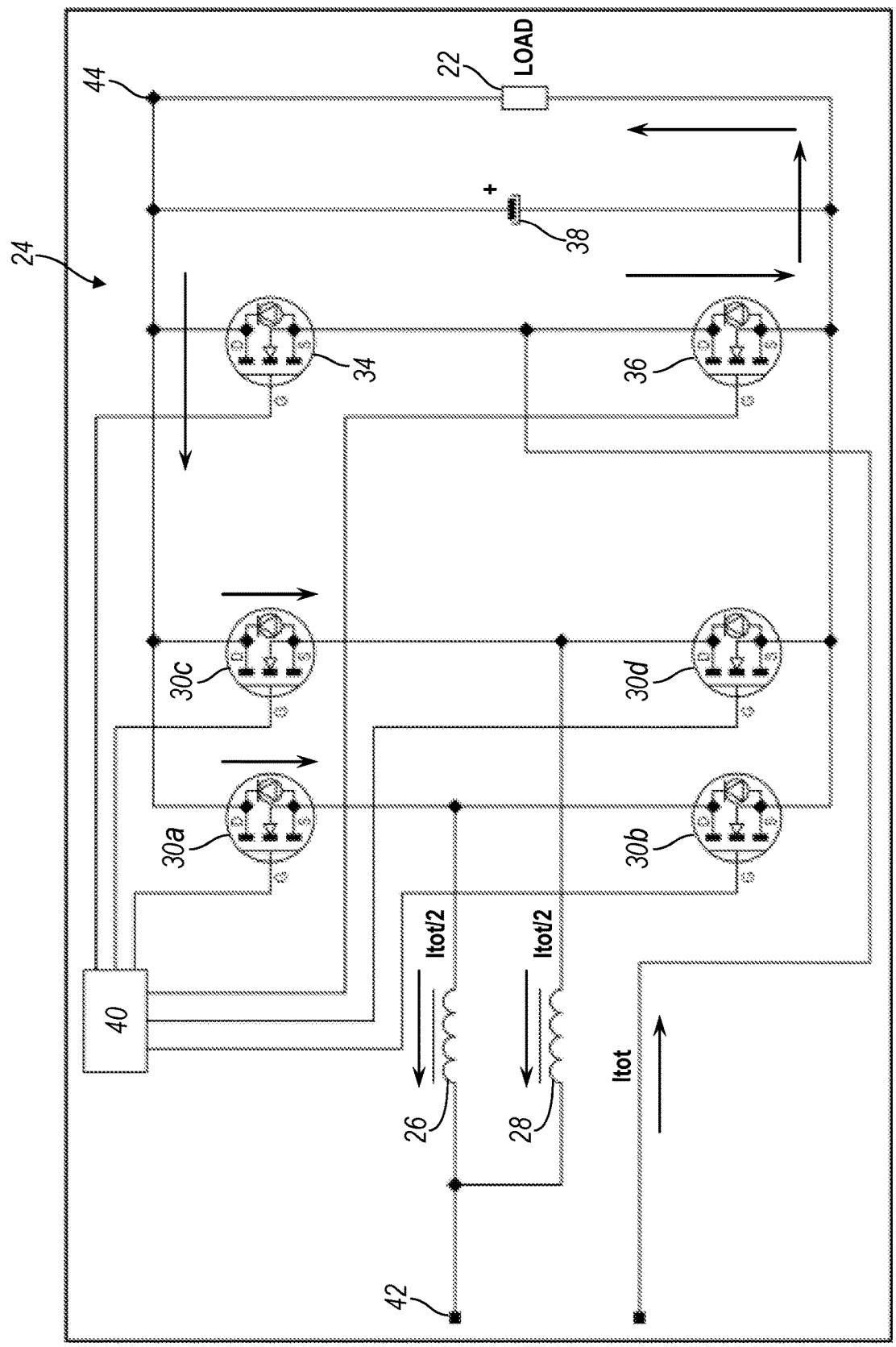
FIG. 6 is a circuit diagram depicting an implementation of a PFC module supplying electrical power from the vehicle battery to the electrical grid.
Figure 7:
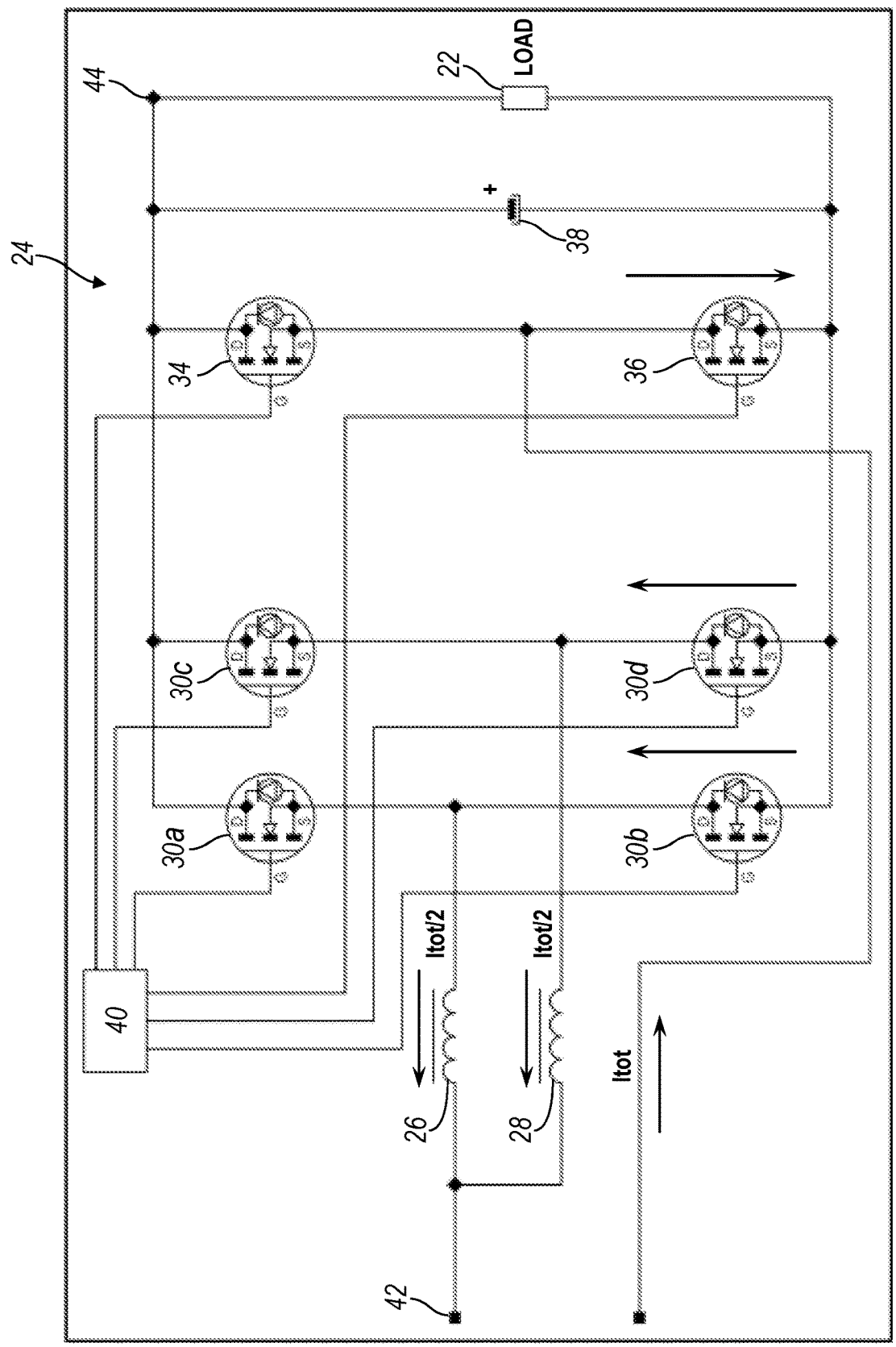
FIG. 7 is a circuit diagram depicting an implementation of a PFC module supplying electrical power from the vehicle battery to the electrical grid.
Figure 8:
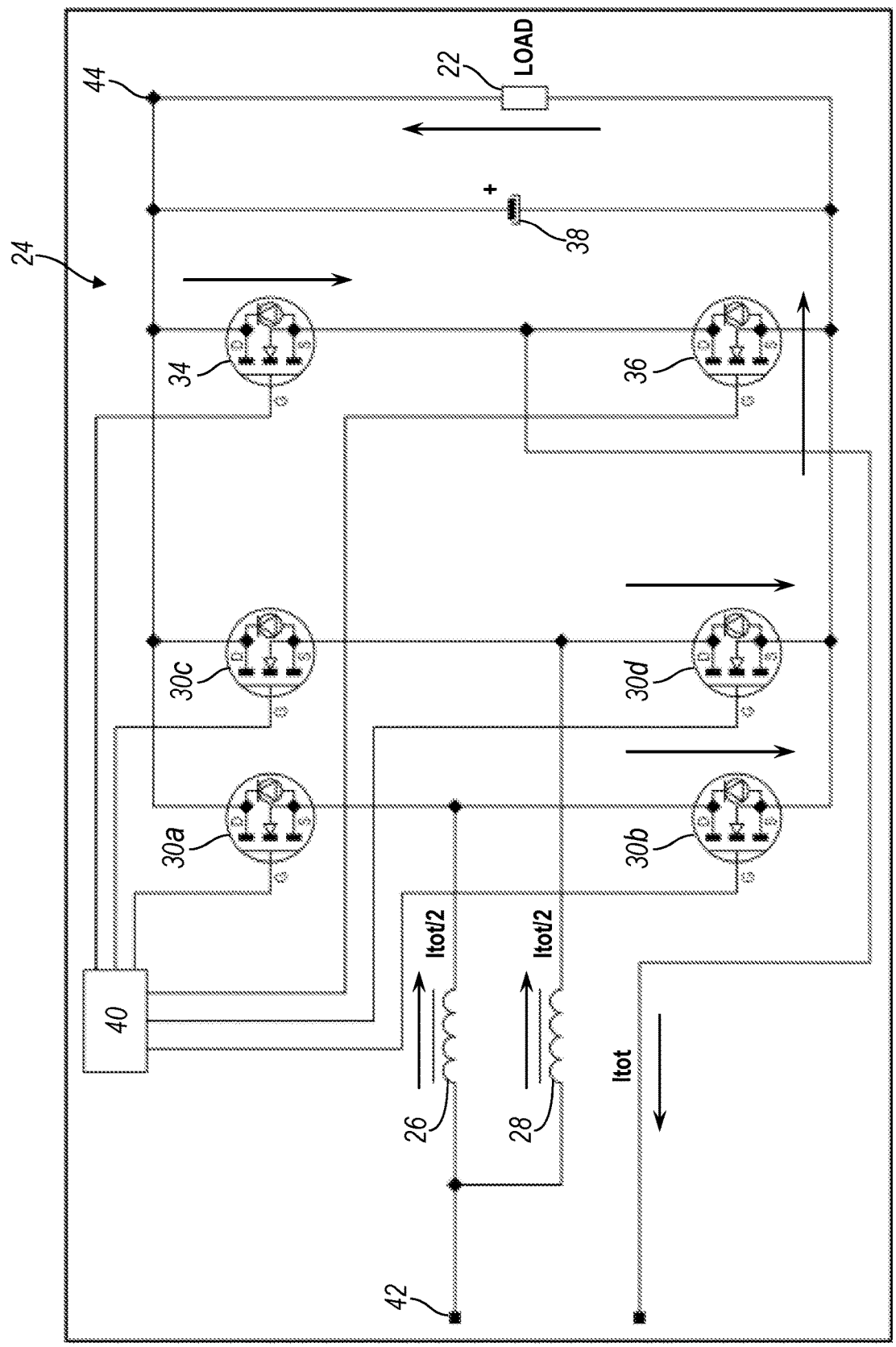
FIG. 8 is a circuit diagram depicting an implementation of a PFC module supplying electrical power from the vehicle battery to the electrical grid.
Figure 9:
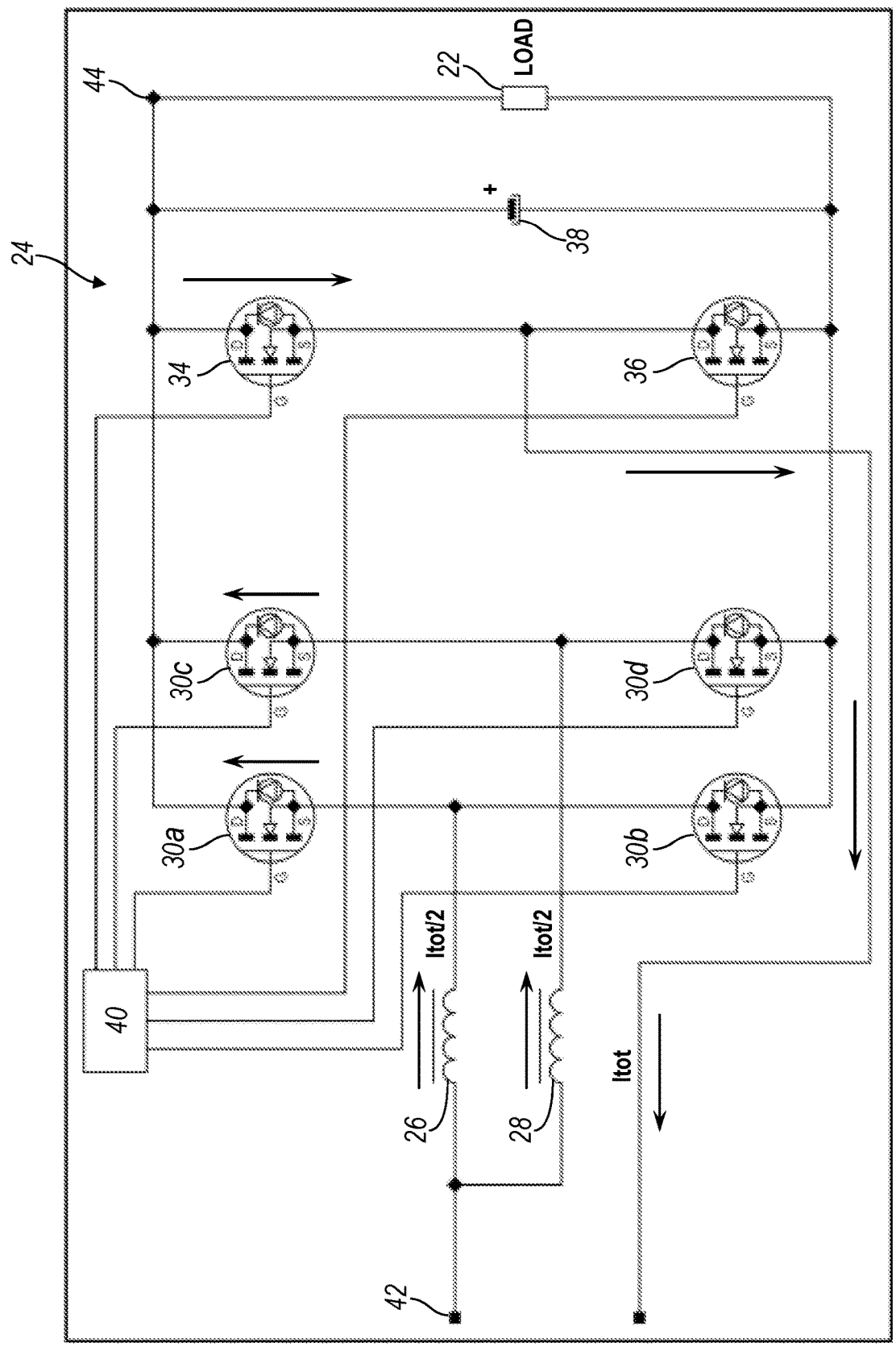
FIG. 9 is a circuit diagram depicting an implementation of a PFC module supplying electrical power from the vehicle battery to the electrical grid

Turning to FIGS. 6-9, the PFC module 24 is depicted operating to communicate electrical power from the vehicle battery 22 to the electrical grid 12. FIGS. 6-7 depict a positive portion of single-phase AC current provided from the PFC module 24 to the electrical grid 12 whereas FIGS. 8-9 depict a negative portion of the single-phase AC current. The single-phase electrical current can be received at the grid connector 42. Electrical current can be divided between the first inductor 26 and the second inductor 28 as it is communicated from the primary switches 30. During the positive portion of the single-phase AC current, the microprocessor 40 can open switch one 30a, switch three 30c, and the second rectifying switch 36 while closing switch two 30b, switch four 30d, and the first rectifying switch 34. Electrical current can flow through switch one 30a, switch three 30c, and the second rectifying switch 36 as is shown with arrows in FIG. 6.

The microprocessor 40 can then open switch two 30b and switch four 30d while closing switch one 30a and switch three 30c; the second rectifying switch 36 can remain open. Electrical current can flow through switch one 30a, switch three 30c, and the second rectifying switch 36 as is shown with arrows in FIG. 7.

During the negative portion of the single-phase AC current, the microprocessor 40 can open switch two 30b, switch four 30d, and the first rectifying switch 34 while closing switch one 30a, switch three 30c, and the second rectifying switch 36. Electrical current can flow through switch two 30b, switch four 30d, and the first rectifying switch 34 as is shown with arrows in FIG. 8.

The microprocessor 40 can then open switch one 30a and switch three 30c while closing switch two 30b and switch four 30d; the first rectifying switch 34 can remain open. Electrical current can flow through switch one 30a, switch three 30c, and the first rectifying switch 34 as is shown with arrows in FIG. 8. The sequential opening and closing of switches 30, 34, 36 as described above with regard to FIGS. 6-9 can repeat as single-phase AC current is supplied from the EV 14 to the electrical grid 12.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A power factor correction (PFC) module configured to electrically connect with an electrically-propelled vehicle and bi-directionally communicate single-phase alternating current (AC) between an electrical grid and the electrically-propelled vehicle, comprising:
   a first inductor electrically connected to a first primary switch and a second primary switch;
   a second inductor electrically connected to a third primary switch and a fourth primary switch;
   a first rectifying switch electrically connected to the first primary switch and the third primary switch; and
   a second rectifying switch electrically connected to the second primary switch and the fourth primary switch, wherein a microprocessor concurrently opens two primary switches and one rectifying switch while closing two other primary switches and another rectifying switch during communication of single-phase electrical current from the electrical grid through the first inductor and the second inductor to the electrically-propelled vehicle or during communication of single-phase electrical current from the electrically-propelled vehicle through the first inductor and the second inductor to the electrical grid.

2. The PFC module recited in claim 1, wherein the microprocessor, as part of communicating single-phase electrical current from the electrical grid to the electrically-propelled vehicle, opens the second primary switch, the fourth primary switch, and the second rectifying switch during a first duration while alternating current (AC) electrical power is positive and the microprocessor opens the first primary switch, the third primary switch, and the second rectifying switch during a second duration while AC electrical power is positive.

3. The PFC module recited in claim 1, wherein the microprocessor, as part of communicating single-phase electrical current from the electrical grid to the electrically-propelled vehicle, opens the first primary switch, the third primary switch, and the first rectifying switch during a first duration while alternating current (AC) electrical power is negative and the microprocessor opens the second primary switch, the fourth primary switch, and the first rectifying switch during a second duration while AC electrical power is positive.

4. The PFC module recited in claim 1, wherein the microprocessor, as part of communicating single-phase electrical current from the electrically-propelled vehicle to the electrical grid, opens the first primary switch, the third primary switch, and the second rectifying switch during a first duration while alternating current (AC) electrical power is positive and the microprocessor opens the second primary switch, the fourth primary switch, and the second rectifying switch during a second duration while AC electrical power is positive.

5. The PFC module recited in claim 1, wherein the microprocessor, as part of communicating single-phase electrical current from the electrically-propelled vehicle to the electrical grid, opens the second primary switch, the fourth primary switch, and the first rectifying switch during a first duration while alternating current (AC) electrical power is negative and the microprocessor opens the first primary switch, the third primary switch, and the first rectifying switch during a second duration while AC electrical power is negative.

6. The PFC module recited in claim 1, further comprising bulk capacitance wired in parallel with a vehicle battery.

7. The PFC module recited in claim 1, further comprising a microprocessor.

* * * * *